FIG. 3

INVENTOR
STANLEY E. LEHNHARDT
GEORGE G. NELSON

ATTORNEY

INVENTOR
STANLEY E. LEHNHARDT
GEORGE G. NELSON

ATTORNEY

United States Patent Office 3,512,131
Patented May 12, 1970

3,512,131
COMPUTER CONTROLLED SEISMIC DISPLAY
SYSTEM
George G. Nelson and Stanley E. Lehnhardt, Dallas, Tex.,
assignors to Texas Instruments Incorporated, Dallas,
Tex., a corporation of Delaware
Filed Dec. 30, 1966, Ser. No. 606,416
Int. Cl. H04j 3/14; G05b 15/00
U.S. Cl. 340—172.5                                    9 Claims

ABSTRACT OF THE DISCLOSURE

Digitized seismic data procesed by a computer is transmited under the control of an interface unit between any one of several of input devices and any one of several output devices. The coupling between the computer and such devices provides for an on-line operation.

FIELD OF THE INVENTION

This invention relates to seismic exploration and more particularly to the computer control of the input and output of seismic signals as processed by a computer for the ultimate display and presentation of the processed data by an on-line control of input and output devices.

PRIOR ART

In seismic exploration, seismic signals have been processed in digital form in a manner disclosed by Foote et al. U.S. Pat. 3,134,957. That is, signals from a plurality of seismic detectors are amplified and applied to a multiplexer following which the signals are digitized and recorded on magnetic tape. Such tapes are then employed to input the digitized seismic data to computers of the type as described and claimed in the Baker et al. U.S. Pat. 3,074,636.

In the operation of such computers and in carrying out digitized seismic data processing operations the output from such computers have been stored on magnetic tape. After completion of the data processing operation and the recording of the output data on such tapes, the tapes have then been employed in an off-line system wherein the data is played back from the tape and is converted to form desired for display. Generally, a permanent visual display is produced. Displays thus produced have taken any one of several different forms. Seismic section plotters of the type manufactured and sold by SIE of Houston, Tex., identified as SIE RA-12 section ploters, permit the selection of any one of several different modes of recording including wiggle-trace, variable density, variable area and combinations thereof.

Furthermore, advantage has been taken on the flexibility afforded in outputing such seismic data. Individual multi-trace seismograms, 12 to 24 traces, have been recorded from computer data stored on magnetic tape. Data stored on magnetic tape is generally in separate sets of, for example, 24 traces per seismogram.

In order to carry out the off-line formation of an ultimate presentation of the seismic data, it was found that there were so many individual adjustments and instrument settings necessary to translate the seismic traces from field tape into the form of display ultimately desired that loss of time and inconsistent results were obtained. It was therefore found highly desirable to eliminate, as far as possible, all manual operations in utilization of seismic data from the computer output.

SUMMARY

In accordance with the present invention, a computer for processing seismic data in multiplexed digitized form is connected through a controller to a plurality of output display units. Each display unit is adapted to present data in its own unique form. A digital-to-analog converter and demultiplexer is imposed between the computer and the display unit. Means are provided for on-line control of the controller for selection of one display unit or combinations of several such units and for control of flow of data issuing from the computer to the selected unit or units.

PREFERRED EMBODIMENTS

Figure 1:
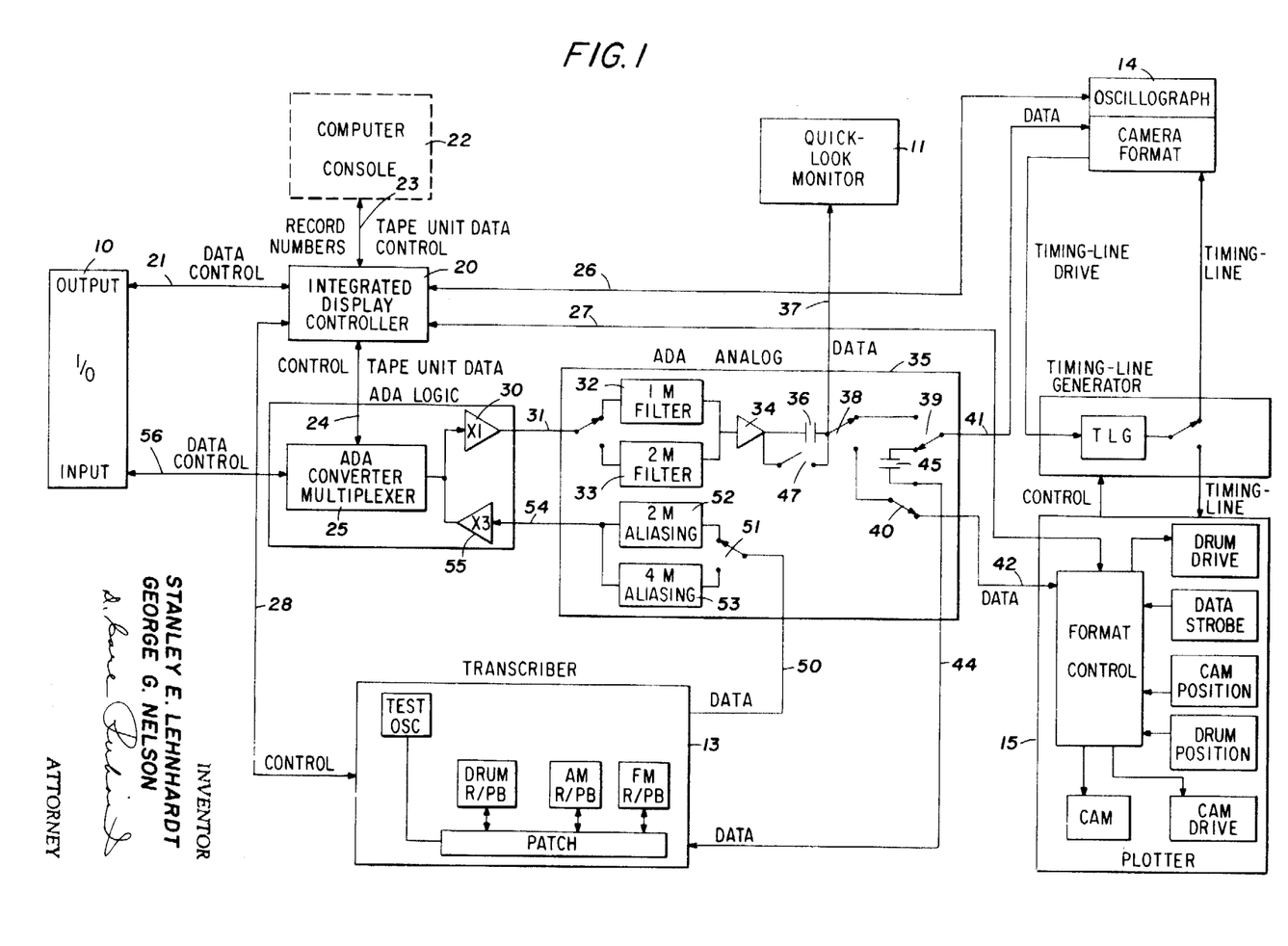
FIG. 1 is a block diagram of the display control system of the present invention.

In the system illustrated in FIG. 1 a computer I/O channel 10 serves to supply output data and control signals to an integrated display system wherein an object is to provide for anyone of several different ultimate displays or combinations thereof. One display is formed on a cathode ray tube monitor 11 on which a selected set of seismic signals may be displayed in order to check for quality control of the data as processed by the computer. The seismic traces displayed on a cathode ray tube 11 would serve to indicate the presence of unwanted noise or improper operation of one or more channels in the processing operation.

A second unit which may be employed as an output device is a transcriber 13. The transcriber 13 includes magnetic recording drums on which the data from the computer as applied by way of I/O channel 10 is ultimately recorded on magnetic tape.

A third unit is an oscillograph 14 on which individual seismograms, for example, 24 trace records, are produced. Such unit finds use primarily in conjunction with monitor tube 11 in quality control operations.

The most frequently used, and in reality, the ultimate objective of the data processing operation is in the use of a section plotter 15 on which the signals forming the plurality of multi-trace seismograms are ultimately recorded in side by side relation to form an extended record section. The section ploter 15 may be of the type above identified, manufactured by SIE of Houston, Tex. In such unit, a 40 inch film is clamped onto a drum and the seismic traces are then written onto the film as wiggle trace, variable area or variable density. Ten to forty 24-trace seismograms may conveniently be recorded on such a film.

By the present invention, the requirement for manual adjustments of various components of the system is minimized as is the cost of the ultimate display system. Intermediate magnetic tape recording and the buffer memories necessary for operation in an off-line mode are not required. Rather, there is provided an integrated display controller 20 which is programable for eliminating much of the manual control of the units 11, 13, 14, and 15.

Controller 20 is connected to the I/O unit by way of a data and control channel 21. A computer console 22 is connected by way of a channel 23 to the controller 20. The controller 20 is connected by way of the channel 24 to an ADA converter and multiplexer 25. Controller 20 is also connected by way of control channels 26 and 27 to the oscillograph 14 and the plotter 15, respectively. The transcriber 13 is connected by way of channel 28 to the controller 20. The ADA unit 25 is connected by way of an amplifier unit 30 to a channel 31 which leads to a filter section. The filter section includes smoothing filters 32 and 33. The signal from amplifier 30 is in analog form but will contain ripple due to the operation of the ADA unit 25. The filters 32 and 33 may be employed for eliminating the undesired ripple. The output of the selected filter is applied, by way of the amplifier 34, to a selector unit 35. Analog data which is coupled by a capacitor 36 in selector unit 35 is applied directly by channel 37 to the monitor 11 and, by way of switches 38 and 39, to the oscillograph 14. Analog data may also be applied, by way of switches 38 and 40, to the plotter 15. The data may also be applied, by way of switches 38 and 40 and the channel 44, to the transcriber 13. In such case, the capacitor 45 leading to switch 39 and channel 41 applies data simultaneously to the oscillograph 14.

Further, there will be noted that a D.C. path is afforded by way of switch 47.

Transcriber 13 may serve as an input device wherein data from magnetic records mounted in transcriber 13 is transmitted by way of channel 50 and switch 51 to filters 52 and 53. Filters 51 and 52 are low pass filters which eliminate unwanted high frequency noise on the channel 50. The output of the filter is then applied by way of channel 54 and amplifier 55 to the converter multiplexer 25. The data thus converted and multiplexed is then transmitted by way of channel 56 to the I/O unit 10 for processing by the computer. Further, it will be noted that the computer data from the I/O channel 10 is applied to the converter unit 25 by way of channel 56.

It will be understood that the diagram of FIG. 1 is a highly simplified diagram with the multi-path channels being represented by the single lines. The traces from seismograms are ordinarily processed in parallel multi-channel operation and in such case the channels 56 are multi-path channels suitable for transmitting a record of 30 traces, for example, simultaneosuly to the converter 25. Similarly the amplifier 30 and channel 31 would have a corresponding number of separate signal paths. Finally the data channels 37, 41, 42 and 44 leading to the devices 11, 14, 15 and 13 respectively are multi-path data channels.

The system including the I/O unit 10 is preferably operated in connection with a computer such as manufactured by Texas Instruments and identified as TIAC 870. It may also be operated in conjunction with the computer described in the Baker et al. U.S. Pat. 3,074,636 and manufactured by Texas Instruments, Inc. of Dallas, Texas, identified as TIAC 827.

In accordance with one embodiment of the present invention, the controller 20 was specifically formed to operate with the TIAC 870 computer. This controller is of the form illustrated in FIG. 2.

The system provides this display/recording capability to the computer system by operating as an (I/O) 10 device to and from the computer. Data are transferred to and from the display at rates of 32, 16 or 8 kHz.

In the embodiment of the system, the four major display and/or recording components, 11, 13, 14 and 15 comprised:

(a) An applied Magnetics VM1-St. Visual Monitor for the quick-look monitor 11.
(b) A SIE MS–600 Transcriber for unit 13.
(c) A SIE Model VS–6 Recording Oscillograph for camera 14.
(d) A SIE Model PL–605B Cross-Section Plotter for plotter 15.

Associated format units and timing-line generators were provided with these display devices.

The system may be either AC- or DC-coupled to the various output devices available as through switch 47.

When operating as an output device, the system had the following frequency response characteristics:

| Sample rate (kHz.) | Coupling (AC) | (DC) | Upper roll-off rate (db/octave) | Lower roll-off rate (db/octave) |
|---|---|---|---|---|
| 1 (1 ms.) | 6–350 | 350 | 24 | 6 |
| 0.5 (2 ms.) | 6–168 | 168 | 24 | 6 |
| 0.25 (4 ms.) | 6–75 | 75 | 24 | 6 |

When operating as an input device, the system had the following frequency response characteristics:

| Sample rate (kHz.) | Response (Hz.) | Upper roll-off rate (db./octave) | Lower roll-off rate (db./octave |
|---|---|---|---|
| 1 (1 ms.) | 0.5–350 | 84 | 6 |
| 0.5 (2 ms.) | 0.5–168 | 84 | 6 |
| 0.25 (4 ms.) | 0.5–75 | 84 | 6 |

The ADA converter had a dynamic range of 84 db, with the maximum output being ±4.096 v. When used as an input device, the system accepted inputs up to ±1.4 v. in each channel.

There were eight different modes of operation:
(a) Unbuffered I/O 10 to Camera 14 and Monitor 11;
(b) I/O 10 to Camera 14 and Monitor 11;
(c) I/O 10 to Monitor 11 only;
(d) I/O 10 to Transcriber 13 and Monitor 11;
(e) I/O 10 to Transcriber 13, Camera 14 and Monitor 11;
(f) I/O 10 to Plotter 15 and Monitor 11;
(g) Transcriber 13 to I/O 10 and Monitor 11;
(h) Transcriber 13 to I/O 10, Camera 14 and Monitor 11.

Mode (a)

In this mode, data are transferred from core storage through the I/O channel 10 to the camera 14 and the monitor 11. Word rates were 16 or 32 kHz with the appropriate set of smoothing filters.

Camera 14 produced strip film or paper records at film speeds from 3.5 to 20 inches per second selectable through manual exchange of gears. Camera 14 provided five modes of presentation under manual selection:
(a) Variable Area;
(b) Variable Density;
(c) Wiggle Trace;
(d) Wiggle Trace Combined with Variable Area; and
(e) Wiggle Trace Combined with Variable Density.

DC coupling to the camera is effected under program control and is used only in the wiggle trace mode of operation.

Mode (b)

Routing and operating parameters in this mode are the same as in Mode (a), but this mode is used in buffered device-to-device data transfer.

Mode (c)

This mode permits data transfer to the monitor 11 only for monitoring the output of any device on the same channel or from core itself. Word rates of 16 or 32 kHz are selectable. Due to A-C coupling in the monitor 11, only A-C operation is used.

Mode (d)

In this mode, data are transferred from the channel to the transcriber 13 where transcription is onto either amplitude modulated, frequency modulated or analog tapes. Word transfer rates of 16 or 32 kHz are employed. Due to A-C coupling in the transcriber, only A-C coupling is employed in switch unit 35.

Mode (e)

In this mode, the transcriber is operational as in Mode (d), but the camera 14 is also used for simultaneous operation. In this mode, the camera 14 is employed with film speeds selected in the range of 3.5 to 20 inches per second and any one of the above five modes of presentation is selected.

To prevent overdrive of the camera galanometers during data transfer to the transcriber 13, 100-percent digital modulation is made to give only 0.75 in. of galvanometer deflection.

Mode (f)

This mode enables data transfer to the cross-section plotter 15. The plotter produces cross-sections consisting of a group of records aligned side-by-side with an accuracy of ±0.5 milliseconds. The second section may be written on film or paper up to 42 in. wide by 52 in. long. Any one of 16 drum-surface speeds may be selected under program control in a range of 3.75 to 20 inches per second. Any one of the five modes of presentation are available.

Horizontal trace spacing is continuously adjustable from 4 to 24 traces/in. with step adjustment to 48 traces/in.

Mode (g)

In this mode, analog data on records fitted on to one of three drums in transcriber 13 are converted to digital data and transferred to the input side of the I/O channel 10. Adjustments are made in transcriber 13 to produce 100-percent digital modulation from 100-percent analog modulation. Word transfer rates of 8 to 16 kHz are employed under program control. Due to A-C coupling in the transcriber, only A-C coupling is employed in this mode.

Mode (h)

This mode allows simultaneous operation of camera 14 and transcriber 13. All operations are the same as mode (g) for the transcriber. The camera 14 will display the AC-coupled transcriber's analog output. Again a ¾-in. galvanometer defection corresponds to 100-percent modulation.

Horizontal trace spacing is continuously adjustable from 4 to 24 traces/in.

Controller 20

It is the function of the controller 20 to control and monitor the operation of the devices 11, 13, 14 and 15. To accomplish this, the controller contains initialization list hardware and the bulk of list decoding logic. The controller also provides the data conversion timing for the display logic. The initialization list format is shown in Table I and the general logic structure of the controller 20 is shown in the block diagram FIG. 2.

Figure 2:
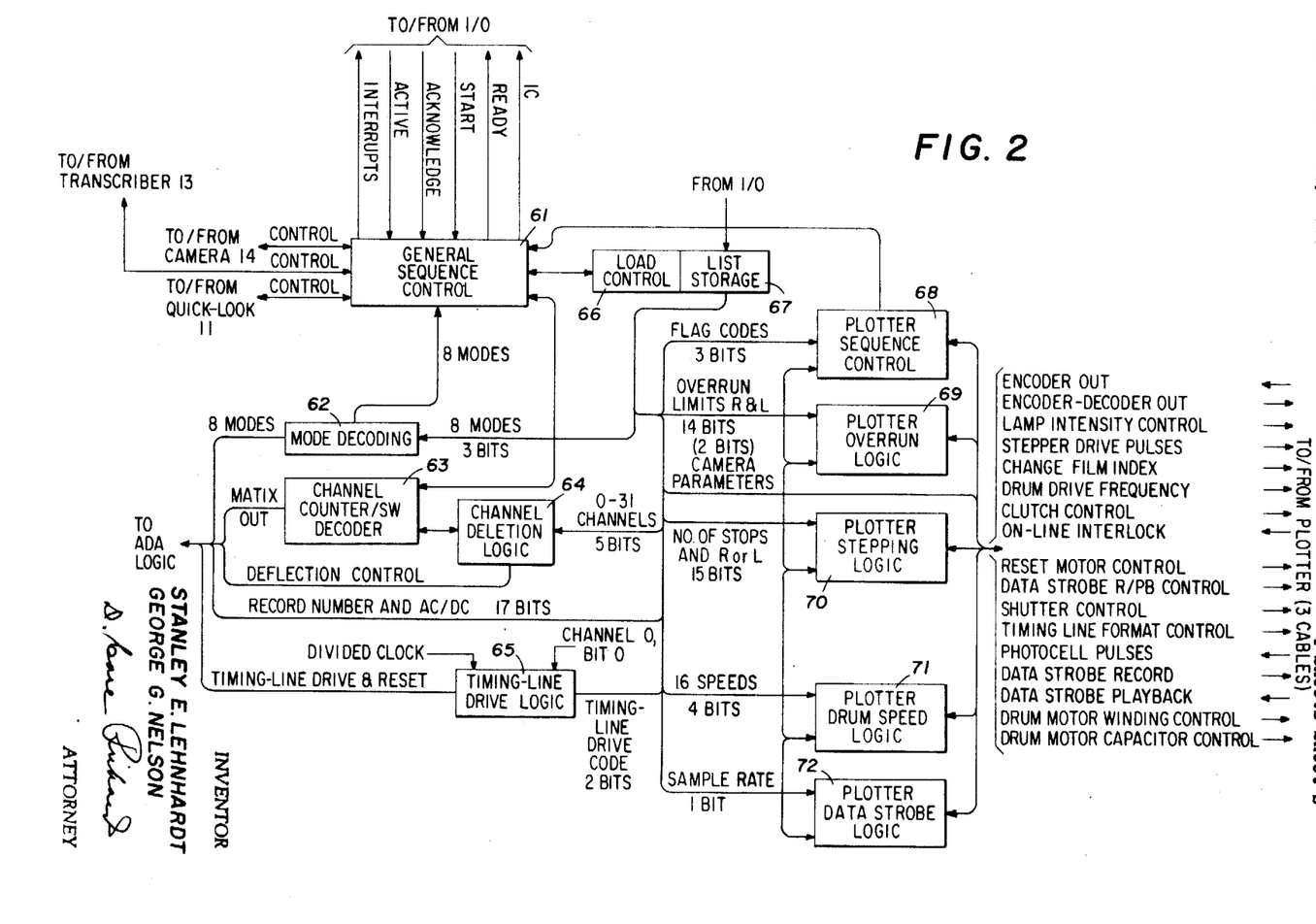
FIG. 2 is a functional block diagram of the controller of FIG. 1.

The controller 20 of FIG. 1 has been illustrated in functional form in FIG. 2. The controller includes twelve major sections. The general sequence control section 61 provides the principal control of data and commands the flow to and from the I/O unit 10, to and from monitor 11, to and from transcriber 13, to and from camera 14, and to the plotter 13.

A mode decoding section 62, a general counter/SW decoder section 63, a general detection logic section 64 and the timing-line drive logic section 65 are all coupled to the ADA logic. A load control section 66 and a list storage section 67 are coupled to the I/O 10, to the general sequence control section 61, to the mode decoding section 62 and to a plotter section. The plotter sections include five primary control sections including plotter sequence control section 68, plotter overrun logic section 69, plotter stepping logic section 70, plotter drum speed logic 71 and plotter data strobe logic 62. The controller and the control paths, as labeled in FIG. 2 are further described hereinafter.

TABLE I.—INITIALIZATION LIST FORMAT

The discussion that follows is divided into three parts for ease of analysis:

Part 1—General Sequence Logic
Part 2—List Storage Logic
Part 3—Plotter Logic.

Part 1

Figure 3:
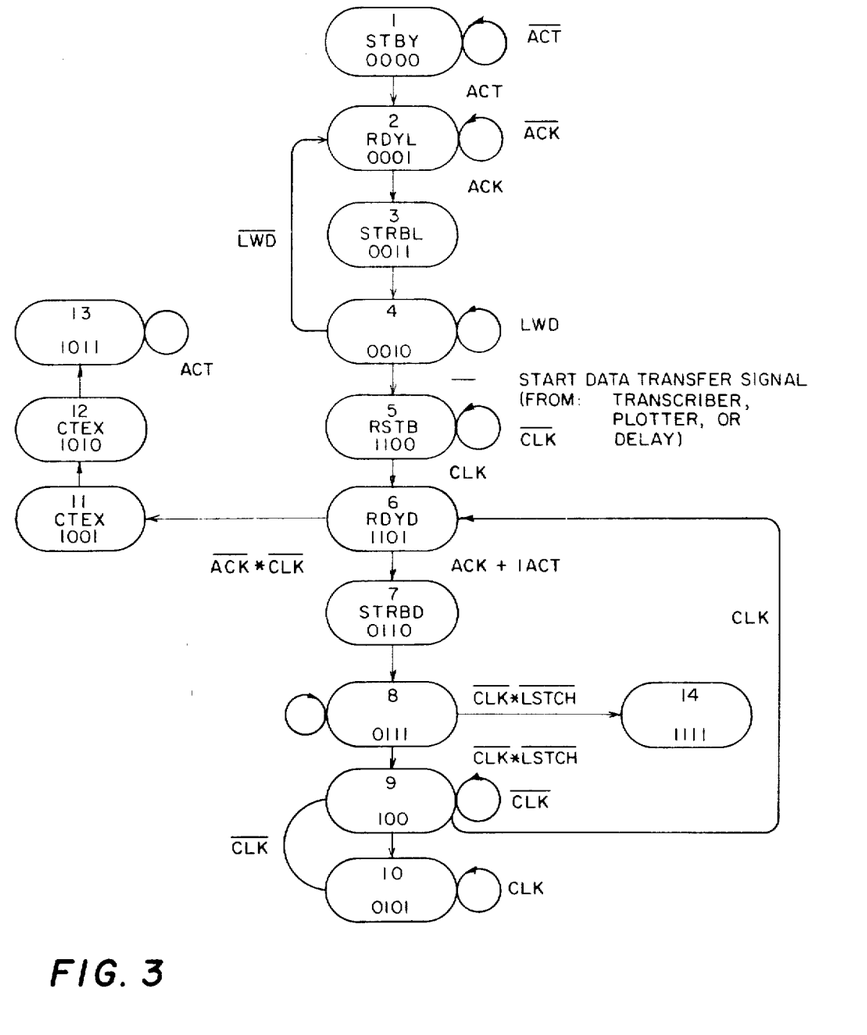
FIG. 3 is an abbreviated general sequence chart illustrating operation of the invention.

The general sequence logic consists primarily of the general timing logic for the system. FIG. 3 illustrates an abbreviated general sequence flow chart that is applicable to all modes of IDD operation.

For general timing, four flip-flops, IDFSQCA through IDFSQCD, are decoded to form the different states. While the channel remains inactive, the logic is forced into the "standby" state (STBY). When the channel (input or output side) becomes active, the "ready list" (RDYL) state is assumed, and a "ready" (RDY) signal is transmitted to the channel to indicate that the controller 20 is ready for the first list word. As the computer acknowledges (ACK) that a word is ready, the sequence counter advances to the "strobe list" (STRBL) state and strobes the first list word into the first list storage register. After completing this action, the sequence counter branches back to the RDYL state and cycles through STRBL for each list word until the controller signals a "Last Word" (LWD) signal that all the initialization words have been received.

The sequence counter remains in the state 4 until data transfer is initiated. Data transfer is started in the modes not involving either the transcribed 13 or plotter 15 after a fixed 250-msec. delay after a "start" (ST) signal is received from the channel. In modes involving the transcriber 13, transfer is initiated by a signal from a reluctance pickup on the revolving tape drum shaft. Transfer in the plotter mode is begun by a photocell signal triggered by the revolving drum in plotter 15.

The sequence counter advances to the "reset B" state (RSTB) with the data "clock" (CLK) at its "zero" state (gated on by the data transfer signal). CLK rates are set by the initialization list and are 32, 16 or 8 kHz. The RSTB signal resets the multiplexer to zero in preparation for the first data word.

As CLK moves to its "one" state, a sequence counter advances to the "ready data" (RDYD) state and a ready signal is sent to the output side of the I/O channel (if an operation code has been selected that requires data transfer from the channel). If a transcriber-to-I/O code has been selected, the analog-to-digital (A–D) conversion is initiated.

An ACK signal from the output channel or an "input channel active" (LACT) level will allow the sequence counter to advance to the "strobe data" (STRBD) state. STRBD is used in channel-to-display data transfer only and strobes a data word into the logic unit for digital-to-analog (D–A) conversion. If an output channel ACK is not received before the CLK signal returns to its zero state, the sequence counter will move to a "critical time exceeded" (CTEC) state and an interrupt will be sent to the output channel.

The next computer clock pulse will advance the state counter from STRBD to a delay state until the CLK signal returns to its zero level. If a "last channel" (LSTCH) logic level has not been achieved (indicating that the last channel in this data block has not yet been transferred), the sequence counter jumps to state 14 as CLK goes to zero.

The next CLK pulse advances the channel counter (multiplexer) and moves the sequence counter to the RDYD state; and the loop through STRBD, state 8, state 14, and RDYD is maintained until LSTCH becomes true, indicating that all the words required for that block of data have been received.

When LSTCH is true and CLK goes to zero, the sequence counter advances from state 8 to state 9 where the channel is incremented one count.

On the next CLK pulse, a test is made for "channel counter=31" (CH31) and, if CH31 is true, the sequence counter returns to the RDYD state to begin the transfer of words in a new block. If CH31 is not true, the sequence counter moves to the "count at clock" (CAC) state. The next CLK pulse returns the sequence counter to state 9 where the channel counter is advanced again and another CH31 test made. This loop is maintained until the counter goes to channel 31.

After each cycle of the multiplexer, a "decrement counter" (DCTR) pulse is sent to the I/O channel to decrement a computer output block counter. The input block counter is decremented. The general sequence itself is terminated by the I/O channel when the block counter is decremented to zero or by the transcriber 13 or plotter 15 as their individual drums revolve to a non-operating zone and an "operation complete" (OPCOM) signal is generated and sent to the channel. In either situation, ACT is dropped and the sequence counter returns to the STBY state.

Timing-line drive (TLD) is also generated in the general sequence portion of the logic. If called for in the list, a 100-, 200- or 400-p.p.s. signal can be automatically derived using the rate divider (IDFRDL, M, N & P) to appropriately divide the multiplexer's recycle rate. The "word rate," zone E of Table I determines the multiplexing rate, while the "sample rate," zone U of Table I, or the real-time sample rate of the original data, is used to determine the divisor. These codes combine to generate a timing line for each 10 milliseconds of real-time data. If automatic timing lines are not called for in the list zone L, a timing line will be generated each time a 1 is contained in bit 0 of the channel zero word of a data block.

From 1 to 28 consecutive data (multiplexer) channels may be selected, zone C of Table I, for display or transcription. When the multiplexer sequences to a print number stored in zone C, a LSTCH signal is generated to be used in general timing operation to inhibit word transfer through the deleted channel(s) multiplexed period. In addition a "galvanometer deflection" flip-flop (IDFGD) is set to send an off-scale deflection D-C voltage to any unused galvanometers.

In the special situation of all 0's stored in zone C, the multiplexer decoding is interrupted to send data channel 1 to galvanometer 12. All other galvanometers are deflected by IDFGD.

Zone A, Table I, is decoded into modes in the general sequence logic for use in it and the other logic sections of the controlled 20 as well as the logic units.

Camera starting (CAMRUN) is gated to correspond to the operation code. In modes requiring monitor 11 and camera 14, the camera is started when a "start" (ST) is received from the channel. A fixed electronic delay of 250 msec. gives the camera starting time before data transfer is begun. In modes involving camera 14 and transcriber 13, the camera 14 is started when a "transcriber's cycle" (TXCCY) micro-switch operates approximately 250 msec. before data transfer. Data routing is under control of the logic units and accomplished in the analog unit of FIG. 1.

The monitor 11 is used in conjunction with all the other display devices as well as with the magnetic tape units in the system. The operation of the monitor 11 is controlled from the main console 22 where one of five interlocked switches is used to select either monitor 11 operation or direct operation (independent of the channel) with one of the magnetic tape input units not shown.

In operation, the monitor 11 is erased (QER) by ST in camera modes, by TXCCY in transcriber modes and by "plotter shutter activate" (PSHA) preceding data transfer in the plotter mode. The quick-look sweep (QSW) is initiated at the start of data transfer.

Figures 4, 5:
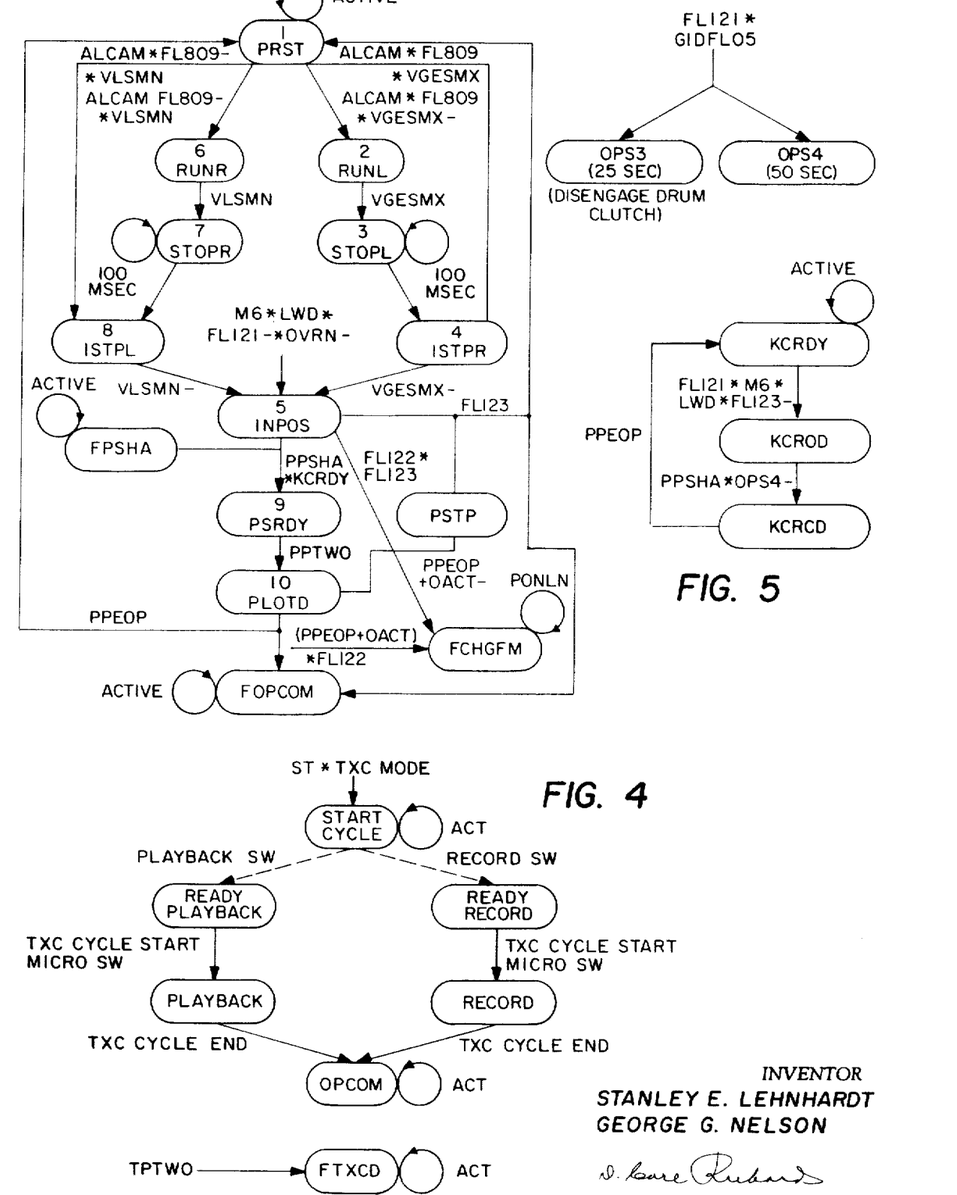
FIG. 4 is a sequence chart for operation of the transcriber of FIG. 1.
FIG. 5 is a sequence chart for the operation of the plotter of FIG. 1.

The transcriber sequence chart is shown in FIG. 4. An ST signal from the computer (after initialization in the transcriber mode) illuminates an indicator (START CY- CLE) in the transcriber 13. Based on information printed out on a printer under program control, the transcriber 13 is loaded with tape. A READY PLAYBACK or READY RECORD button is then depressed as may be appropriate. As the drum in transcriber 13 revolves and operates a transcriber cycle (TXCCY) microswitch, the corresponding PLAYBACK or RECORD lamp in transcriber 13 illuminates and the electronics in transcriber 13 activated accordingly. The drum continues to revolve approximately 250 milliseconds until the transcriber's start-of-data-transfer position is reached and the TPTWO from a reluctance pickup is sent to the controller to set FTXCD, the transcriber data flip-flop. Data are transferred until the channel block counter is decreased to zero or TXCCY is dropped off by the transcriber, whichever occurs first. If TXCCY is dropped first, the data block being transferred is completed and an "operation complete" (OPCOM) signal is sent to the channel from the controller.

By depressing a TRANSCRIBER-TO-CAMERA switch on the transcriber console of 13, the system is made busy to the channel and data paths selected for transcriber-to-camera operation. Depressing a READY PLAYBACK button will initiate a cycle, TXCCY will start the camera 14 and erase the monitor 11. TPTWO will sweep the monitor 11, and the cycle will be terminated when TXCCY drops off. No galvanometer deflection will occur.

In all modes of operation, the multiplexer is run prior to data transfer to stabilize the analog outputs. The multiplexer is also run during magnetic-tape-to-monitor 11 and during TEST. TEST is initiated from any one of the devices, the display system is taken off line, and a sine wave is transmitted to that device for test purposes. Multiplexer operation during data transfer depends upon the mode of transfer.

Part 2: List storage logic

The list storage logic is made up of list storage registers and the load control for these registers. Computer-originated initialization data are taken from the active side of the I/O channel 10 and stored word by word in storage registers. Various load signals are also sent back to the I/O 10 channel to indicate word position (in time) of initialization data required by and stored in the I/O channel.

The list storage registers consist of the "list storage flip-flops" FL(X) (Y) where X is the word number (1 through 11) and Y is the bit number (07 through 23).

The gate signals for the list flip-flops, GIDFL(X) (where X=word number), are decoded from the word counter (for the multiplexer 25) and strobed by STRBL from the general sequence logic.

Part 3: Plotter logic

Due to the complexity of control, the plotter logic section is separated from the other logic and broken into subdivisions.

The plotter sequence logic flow is shown in FIG. 5 with the legends employed being set out in Table II.

TABLE II

ACT—ACTIVE
PRST—PLOTTER RESET
RUNR—RUN RIGHT
RUNL—RUN LEFT
STOPR—STOP RIGHT
STOPL—STOP LEFT
ISTPL—INITIAL STEP LEFT
ISTPR—INITIAL STEP RIGHT
INPOS—IN POSITION
FPSHA—FLIP-FLOP PLOT SHUTTER ACTIVATE
PSTP—PLOT STEP
PSRDY—PLOTTER SHUTTER READY
PLOTD—PLOT DATA
FOPCOM—FLIP-FLOP OPERATION COMPLETED
FCHGFM—FLIP-FLOP CHANGE FILM (−=NOT)
VLSMN—V-SCAN DECODER STANDARD MINIMUM
VGESMX—V-SCAN DECODER STANDARD MAXIMUM
PPSHA—PLOTTER PULSE SHUTTER ACTIVATE
PPTWO—PLOTTER PULSE TIMING WORD 0
PPEOP—PLOTTER PULSE END OF PLOT
PONLN—PLOTTER ON LINE
KCRDY—1 KILOHERTZ READY
KCRQD—1 KILOHERTZ REQUIRED
KCRCD—1 KILOHERTZ RECORDING
OVRN—OVERRUN
ALCAM—ALIGN CAMERA
LWD—LAST WORD
M6—MODE 6
FSTPG—FLIP-FLOP STEPPING (−=NOT)
OACT—OUTPUT ACTIVE
OPS3—ONE-SHOT PLOTTER SEQUENCE 3
OPS4—ONE-SHOT PLOTTER SEQUENCE 4
FL121—'FIRST RECORD' CODE
FL123—'DUMMY RECORD' CODE
FL122—'LAST RECORD' CODE
FL809—'LEFT TO RIGHT' CODE

The sequence control for plotter 15 functions to:
(a) Pre-position the plotter camera if pre-positioning is required;
(b) Re-record the plotters data strobe signal (1 kHz.) if re-recording is required;
(c) Control the sequence of plotter data transfer operations (open camera shutter, signal general sequence logic-to-start data, etc.); and
(d) Initiate between-record camera stepping (lateral movement).

The "plotter reset" (PRST) state is assumed when the system is not active. Five different courses of action are possible after the output chanenl has become active and plotter initialization is complete. The possiblitiies and action are described as follows:

(1) No positioning is required—the list does not contain a "first record" code (zone 0). If no "overrun" (OVRN) signal is present indicating that the camera is within its position limits, the plotter sequence counter advances directly to the "in position" (INPOS) state.

(2) Positioning to the right limit of the drum is required (first bit of zone N is 0), and the camera is presently located right of the right limit (VLSMN is true). The plotter sequence logic advances to the "initial step left" ISTPL) state, and the stepping motor is stepped to move the camera left in $\frac{1}{240}$-in. steps. As soon as the right limit is passed (VLSMN becomes false), the plotter sequence counter is advanced to INPOS.

(3) Positioning to the right limit is required, and the camera is presently located to the left of the right limit. The plotter sequence counter advances to the "run right" (RUNR) state and the fast-return drive motor is engaged to run camera past the right limit. When VLSMN becomes true, the plotter sequence counter advances to the "stop right" (STOPR) state and motion terminates. After a fixed 100-msec. stopping time delay, the plotter sequence counter is advanced to ISTPL and the stepping motor is engaged to move the camera left in $\frac{1}{240}$-in. steps. When VLSMN becomes false, the plotter sequence counter jumps to INPOS and stepping terminates.

(4) Positioning to the left limit is required (first bit of zone N is 1), and the camera is presently located left of the left limit. The plotter sequence counter advances to the "initial step right" (ISTPR) state where the stepping motor is engaged to move the camera right in $\frac{1}{240}$-in. steps. When the left limit is crossed (VGESMX becomes false), the plotter sequence counter is advanced to INPOS and the stepping is terminated.

(5) Positioning to the left limit is required, and the camera is presently located right of the left limit. The plotter sequence counter jumps to the "run left" (RUNL) state and the high-speed motor drives the camera to the left. When the left limit is crossed (VGESMX becomes 1), the sequence counter advances to the "stop left" (STOPL) state and the motor stops. After a fixed 100-msec. stopping time delay, the plotter sequence counter is advanced to ISTPR and the stepping motor is engaged to move the camera right in $\frac{1}{240}$-in. steps. As the left limit is crossed (VGESMX becomes 0), the sequence counter advances to INPOS.

Once the positioning requirements have been met (the INPOS state is assumed) and the plotter's 1-kHz. data strobe signal has been recorded (KCRDY), the next "plotter shutter activate" pulse (PPSHA) will set the "plotter shutter activate" flip-flop (FPSHA) to open the plotter camera shutter and will advance the plotter sequence counter to the "plotter shutter ready" (PSRDY) state. The revolving drum will then generate a second photocell pulse "plotter timing word origination" pulse (PPTWO) and advance the plotter sequence counter to the "plot data" (PLOTD) state. Data transfer will continue from channel to plotter until PLOTD returns to 0.

When a third photocell pulse from the revolving drum "plotter end of plot" pulse (PPEOP) is received, the "operation complete" (FOPCOM) flip-flop is set and the signal sent to the channel where "active" is subsequently terminated. FOPCOM is then reset and the plotter sequence counter is returned to the PRST state. "Output active" may be reset by the channel's block counter reaching zero before PPEOP occurs and the plotter sequence counter returning to PRST directly. In either case, a "plot step" (PSTP) will be initiated to step the camera to a new position in preparation for the next record. If a "last record" code (zone 0) is given, the "change film" (FCHGFM) flip-flop will also be set at this time, lighting the CHANGE FILM indicator on the plotter.

If a "dummy record" code (zone 0) is given, no record will actually be plotted. Instead, the plotter sequence counter will jump from INPOS to PRST on the next computer clock pulse initiating a PSTP and setting FCHGFM as required in the process.

A "first record" code not only requires camera positioning but also signals a change in drum speed requiring a release of the drum drive clutch to protect the gear train during the speed change and a re-recording of the 1-kHz. data strobe signal at the new drum speed. Time delay one-shot OPS3 allows the drum stopping time, while delay one-shot OPS4 allows restarting time. Data strobe recording is inhibited until OPS4 times out.

Data strobe recording is done in a separate group of three states. The "1-kHz. ready" (KCRDY) state is set when the I/O channel is not active. If a "first record" and not a "dummy record" code is selected while the plotter operation mode is initialized, the last word (LWD) of initialization will move the data strobe sequence logic to the "1-kHz. required" (KCRQD) state. The next PPSHA after the drum has come up to speed will advance the logic to the "1-kHz. record" (KCRCD) state which activates the recording electronics in the plotter. The logic is then returned to the KCRDY state, with PPEOP indicating to the plotter sequence logic that a record may be plotted.

A plotter overrun logic system consists of the logic necessary to convert the output of a shaft encoder to an unambiguous binary-coded-decimal number and of a comparator to compare this number with the right and left limits established in the initialization list, zone M, Table I.

The outputs of the overrun logic are the two logic levels VGESMX where the shaft decoder output is greater than or equal to the standard maximum which is the left limit and VLSMN where the shaft decoder output is less than the standard minimum which is the right limit. Such levels are used to determine the overrun interrupt and to serve as operation flags in other logic and the plotter sequence.

Plotter drum-speed logic units function to decode the initialization list and provide the appropriate frequency, winding and winding capacity selections for the plotter's drum drive motor. Four bits are used from the initialization list, zone P, Table I, to select any one of 16 possible drum speeds. The bits are decoded for capacitor and winding selection as well as for galvanometer intensity/1-kHz. gain control.

Because higher drum speeds allow less film exposure time, a more intense galvanometer light source must be used. The intensity in drum speed also increases the amplitude of the 1-kHz. playback signal from the tape head. The same relays used in galvanometer lamp intensity adjustment are also used to control attenuation of the head signal before it is applied to the playback amplifier. Four attenuation steps are made available over the 16-speed range.

Eight different motor-drive frequencies are required over the 16-speed range. These are obtained by dividing the computer's 32 kHz. standard by the appropriate number. The list is decoded to determine the required divisor, and the 7-stage divider is reset each time the value of the divisor is reached. This reset pulse is divided once more by 2 to insure a symmetrical drum-drive signal.

A plotter stepping logic unit is used to form the drive signals for the step motor that positions the camera in plotter 15 and to count the steps to terminate stepping when beween-record stepping is complete.

The frequency source is a voltage-controlled oscillator. The oscillator runs at a low frequency until the stepper motor has been started and has executed 16 steps. The output of the VCO is synchronized, shaped and gated into a 4-stage divider. The last stage of the divider drives a phase-splitter made up of two flip-flops, FPSTDA and FPSTDB. When the correct phase relationship exists between FPSTDA, FPSTDB and the motor-drive flip-flops, FPSTA and FPSTB, the motor-drive flip-flops begin to toggle and the 14-stage step counter is gated on.

In initial positioning, ISTPR or ISTPL, the counter is ignored and the plotter sequence logic is used to control the stepping. In between-record, or plot stepping, PSTP, the counter content is compared with the initialization lists' zone N, Table I, and stepping is terminated on comparison. Stepping direction is determined by the highest order bit in zone N.

A plotter data strobe logic unit forms the 1-kHz. data strobe signal that is to be recorded on the plotter drum and uses the 1-kHz. playback signal to generate a data word strobe signal in the plotter mode.

The record signal is developed by dividing the 32-kHz. computer standard by 32. The divider is reset and the 32-kHz. gated on by PPTWO. This insures phase alignment of the 1-kHz. signal with the PPTWO position on the drum. The 1-kHz. signal is turned off again by the PPEOP pulse from the plotter. This cycle occurs for each revolution of the plotter drum, but a recording is made only when the plotter record electronics are activated in the plotter by the plotter sequence logic.

The playback signal from the plotter is synchronized, shaped and divided according to the word transfer rate specified in the initialization list zone E, Table I. The selected frequency, 1000, 500 or 250 Hz., is used to set the burst-enable flip-flop FBURST. This opens a gate to pass a burst of pulses occurring at an 80-kHz. rate. Following this gating, the 80-kHz. pulse train is divided to form a symmetrical 40-kHz. pulse train. During data transfer to the plotter, this signal is used, in lieu of the 32-kHz. standard, to drive the word counter in the multiplexer. When the word counter has advanced to a count of 31, CH31, FBURST is reset, terminating the pulse train until the next set pulse occurs. Bursts of 40 kHz. allow the multiplexer to cycle in less than its normal period so that a non-uniform 1-kHz. rate of playback pulses can be acepted without a set FBURST signal occurring before it is reset.

An interrupt circuit is provided to signal the computer if one or more 1-kHz. pulses are lost in playback.

Having described the invention in connection with certain specific embodiments thereof, it is to be understood that further modifications may now suggest themselves to those skilled in the art and it is intended to cover such modifications as fall within the scope of the appended claims.

What is claimed is:

1. In a system where a computer processes seismic signals in multiplexed digitized form, the combination which comprises:
   (a) a plurality of output display units each adapted to present said signals in its own unique form,
   (b) a controller unit connected to the I/O channel of said computer and operable in response to commands from said computer to control flow of signals, and
   (c) an analog-digital-analog converter-multiplexer unit connected to said I/O channel, to said controller, and to said display units and including means selectively to cause flow of signals either to or from at least one of said display units via said converter-multiplexer.

2. The combination as set forth in claim 1 wherein said output display units include a section plotter for recording data from a plurality of multi-trace field seismograms and wherein said controller synchronizes the writing of successive seismograms thereon.

3. The combination set forth in claim 1 wherein a temporary signal display is operable in parallel with any other one or combination of said output display units.

4. In a system where a computer processes seismic signals in multiplexed digitized form, the combination which comprises:
   (a) a plurality of output display units each adapted to present said signals in its own unique form, one of which includes reproducing means for field seismograms to operate as an input unit to said computer,
   (b) a controller unit connected to the I/O channel of said computer and operable in response to commands from said computer to control flow of signals,
   (c) an analog-digital-analog converter-multiplexer unit connected to said I/O channel, to said controller, and to said display units and including means selectively to cause flow of signals either to or from said display units, and
   (d) a selector means coupled to said controller in response to commands from said computer reverses the direction of data flow through said demultiplexer and converter.

5. In a system where a computer processes seismic signals in a multiplexed digitized form, the combination which comprises:
   (a) a plurality of output display units each adapted to present said signals in its own unique form,
   (b) a controller unit connected to the I/O channel of said computer and operable in response to commands from said computer to control flow of signals,
   (c) an analog-digital-analog converter-multiplexer unit connected to said I/O channel, to said controller, and to said display units and including means selectively to cause flow of signals either to or from said display units, and
   (d) a selector means coupled to said controller in response to commands from said computer reverses the direction of data flow through said demultiplexer and converter.

6. A system for selective on-line interchange of computer processed seismic signals which comprises:
   (a) a digital computer,
   (b) an input-output unit for said computer,
   (c) a display controller connected to control the data channels extending between said computer and said input-output unit,
   (d) a transcriber for simultaneously recording and simultaneously reproducing multichannel sets of seismic recordings,
   (e) an X-Y plotter,
   (f) a multichannel oscillograph, and
   (g) an analog-digital-analog converter connected by a control circuit to said controller and by data channels to said input-output unit, to the inputs of each of the display units including said transcriber, said X-Y plotter, and said oscillograph responsive to said controller for controlled flow of data in either of two directions therethrough.

7. The combination set forth in claim 6 wherein said converter is provided with an input amplifier and an output amplifier and wherein said output amplifier is provided with a plurality of filters and selector means for control of the frequency character of output signals fed display units and wherein said input amplifier includes a plurality of aliasing filters with means for selectively controlling the passage of signals therethrough to said converter.

8. In a system where a computer processes seismic signals in multiplexed digitized form, the combination which comprises:
   (a) a plurality of output display units each adapted to present said signals in its own unique form,
   (b) a controller unit connected to the I/O channel of said computer and operable in response to commands from said computer to control flow of signals,
   (c) an analog-digital-analog converter-multiplexer unit connected to said I/O channel, to said controller, and to said display units and including means selectively to cause flow of signals either to or from said display units,
   (d) switch means for applying output signals from said converter simultaneously to said plotter and to said oscillograph, and
   (e) means for introducing a difference in the character of the signals applied to said plotter and said oscillograph.

9. In a system where a computer processes seismic signals in multiplexed digitized form, the combination which comprises:
   (a) a plurality of output display units each adapted to present said signals in its own unique form,
   (b) a controller unit connected to the I/O channel of said computer and operable in response to commands from said computer to control flow of signals,
   (c) an analog-digital-analog converter-multiplexer unit connected to said I/O channel, to said controller, and to said display units and including means selectively to cause flow of signals either to or from said display units, and
   (d) switch means for applying output signals from said converter simultaneously to said plotter and to said oscillograph.

References Cited

UNITED STATES PATENTS

| | | | |
|---|---|---|---|
| 3,275,978 | 9/1966 | Shanks | 340—15.5 |
| 3,340,499 | 9/1967 | Hadley | 340—15.5 |
| 3,344,407 | 9/1967 | Koeijmans | 340—172.5 |
| 3,345,608 | 10/1967 | Brown et al. | 340—15.5 |
| 3,376,557 | 4/1968 | Godinez | 340—172.5 |
| 3,393,300 | 7/1968 | Jennings et al. | 235—151 |

PAUL J. HENON, Primary Examiner

R. F. CHAPURAN, Assistant Examiner